US 6,606,408 B1

(12) United States Patent
Kang et al.

(10) Patent No.: US 6,606,408 B1
(45) Date of Patent: Aug. 12, 2003

(54) IMAGE SEGMENTING APPARATUS AND METHOD

(75) Inventors: Dong-joong Kang, Suwon (KR); Seong-deok Lee, Yongin (KR); Ji-yeun Kim, Seoul (KR); Chang-young Kim, Euiwang (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/562,029

(22) Filed: May 1, 2000

(30) Foreign Application Priority Data

Jun. 24, 1999 (KR) .............................. 99-23948

(51) Int. Cl.[7] ................................. G06K 9/00
(52) U.S. Cl. ..................................... 382/164
(58) Field of Search ................ 382/162–167; 358/518–540; 345/589–604

(56) References Cited

U.S. PATENT DOCUMENTS

| 5,852,673 | A | * | 12/1998 | Young | 382/164 |
| 6,151,408 | A | * | 11/2000 | Oosawa | 382/164 |
| 6,236,736 | B1 | * | 5/2001 | Crabtree et al. | 382/103 |
| 6,516,100 | B1 | * | 2/2003 | Qian | 382/165 |

* cited by examiner

Primary Examiner—Jingge Wu

(74) *Attorney, Agent, or Firm*—Burns, Doane, Swecker & Mathis, LLP

(57) ABSTRACT

An image segmenting apparatus and method is provided. The image segmenting apparatus includes an initial image segmenting unit, a region structurizing unit and a redundant region combiner. The initial image segmenting unit converts color signals of an input image into a color space which is based on predetermined signals, and segments the input image into a plurality of regions according to positions of color pixels of the input image in the color space. The region structurizing unit classifies the plurality of regions into layers according to horizontal, adjacent relation and hierarchical, inclusive relation between the regions, and groups adjacent regions into region groups in each layer, so as to derive a hierarchical, inclusive relation between the region groups. The redundant region combiner determines the order in which adjacent regions are combined according to the horizontal, adjacent relation between regions and the hierarchical, inclusive relation between region groups. The redundant region combiner also determines whether to combine adjacent regions according to the determined combination order, and combines adjacent regions if the adjacent regions are determined to be substantially the same. Even if regions appears to be adjacent each other in a region adjacent graph (RAG), a structural inclusive relation between regions can be derived by excluding the combination of the regions or rearranging their combination order according to a hierarchical structure. Subsequently, the mutual relation between two regions can be inferred from the inclusive relation even if the color signals of the two regions, for example, a region in a highlighted area and a region in its surrounding area, are not similar to each other.

9 Claims, 10 Drawing Sheets

IMAGE SEGMENTING APPARATUS AND METHOD

The following is based on Korean Patent Application No. 99-23948 filed Jun. 24, 1999, herein incorporated by reference.

BACKGROUND OF THE INVENTION

1. Field of the Invention

The present invention relates to an image segmenting apparatus and method, and more particularly, to an image segmenting apparatus and method for segmenting an object region having the same color in an image which is input through a camera sensor or a video image, or extracting a significant image region from the image.

2. Description of the Related Art

Generally, an image is composed of three color signals; Red, Green and Blue (R, G, B). Image segmenting operation extracts same color regions or same object regions from an image which is composed of input color signals. The extracted image data can be utilized in fields related to digital image processing such as image analysis, image compression or image recognition for object-based image information processing or automation application. Most of the image segmenting methods based on color signals usually project input color signals onto different types of color spaces and then extract density in each color space, or segment an image taking into account local adjacency of color pixels in an image region. A problem with these conventional image segmenting methods is that objects which are the same or objects having the same color do not show the same color characteristic in an image input through a camera or the like due to complexity, which appears under various environments and conditions related to image formation, and the limit of the image segmenting methods. This problem of the color characteristic causes an excessively large number of noise regions during image segmentation. The color characteristic or brightness characteristic is completely different from or sufficiently deviates from the color characteristic of an original object.

To solve these problems, R. Schettini ("Pattern Recognition Letter", 14, 1993) and R. Beveridge ("IJCV", 2, 1989) removes noise regions, which are generated after initial image segmentation, using color information included in each segment. In this method, a distance between adjacent regions is measured in a color space based on a Eucledian distance or a probabilistic distance, and adjacent regions having smaller color difference from each other are merged into one. However, the method has the following problems.

1. Even if two adjacent regions are segmented from the same object or the same color region in an image, frequently, it is difficult to combine the two adjacent image regions due to lack of similarity between them.
2. Results of sequential combination of adjacent image regions vary according to the order in which the regions are combined.
3. Combination evaluation must be performed with respect to every adjacent region.
4. Information on the importance or size of each region obtained from initial image segmentation, or information on the structural inclusive relations among regions in an image, cannot completely be used.

Illumination, shapes of objects, the objects' mutual geometric arrangement, and mutual position between an observer or an image input apparatus and the objects, are the important components forming an image. Ideal image segmentation is, in spite of these various conditions of image formation, to effectively distinguish significant objects or the same color regions from a background or other objects in a similar manner to human recognition. Generally, for the same objects, or for backgrounds or objects having the same color, shade or shadow regions may occur due to a variety of objects' mutual spatial arrangements and the shapes of objects themselves. The shade or shadow regions are main causes which make image segmentation difficult. In other words, when performing image segmentation using color or brightness distribution information, the shade or shadow regions are extracted as independent regions because each of the shade or shadow regions has an independent color characteristic and brightness distribution. When the extracted shade or shadow regions are removed during the image segmentation, separation of significant objects from the image is greatly influenced by the removal, making the segmenting operation difficult. For example, when the shade regions are removed by using similarity of color information between adjacent object regions in a color space, it is difficult to effectively combine adjacent regions by using only the similarity of color information. Because the color information in the shade regions disappears due to the decline in overall color intensity or consistency of the color information disappears due to image noise. In this case, geometrical information including edge information between regions, or topological information including mutual relationship in arrangement and a degree of adjacency, is utilized.

As pointed out by R. Schettini, there is a method of combining regions by post-processing after initial segmentation, using a region adjacent graph (RAG) (Matas, Int. Conf. on Computer Vision, 1995), which is a graph showing the condition of adjacency between image regions. However, it is difficult to determine an order in combining adjacent regions having similar characteristics, based on only the adjacency condition which has a horizontal structure. For example, when representing relations between regions generated after initial segmentation by a RAG, binary graphs composed of nodes indicating the regions and branches connecting nodes of adjacent regions are generated. Each of the binary graphs has a horizontal structure in which each branch is non-directional. When a region has a plurality of adjacent regions, it is preferable to determine which adjacent region is combined with the region. Even if a region $R_i$ has the most similar color characteristic to a region $R_j$, and thus the region $R_i$, is combined with the region $R_j$, and even if the region $R_j$, is combined with a region $R_k$ which has the most similar color characteristic to the region $R_j$, the region $R_i$ and the region $R_k$ may have different color characteristics. Different combination order may cause completely different results of segmentation. Accordingly, it may be difficult to combine adjacent regions sequentially into one.

To solve the above problems, Rosenfeld ("Digital Picture Processing", Academic Press, 1982) improves an ordering method for combining adjacent regions by repeating a step of combining the most similar two regions among adjacent regions into one and reconstructing a RAG. However, the method also has problems caused by a graph having a horizontal structure. In addition, since there is no information on the importance of adjacent regions when combining adjacent regions based on a RAG, the same combination test and evaluation need to be simultaneously performed with respect to every adjacent region.

SUMMARY OF THE INVENTION

To solve the above problems, it is an objective of the present invention to provide an image segmenting apparatus and method for deriving a hierarchical region structure between regions from a result of initial image segmentation, rearranging the order in which regions are combined and determining hierarchical inclusive relation using the hierarchical region structure so as to find noise regions, and removing the noise regions.

Accordingly, to achieve the above objective, there is provided an image segmenting apparatus includes an initial image segmenting unit, a region structurizing unit and a redundant region combiner. The initial image segmenting unit converts color signals of an input image into a predetermined space, and segments the input image into a plurality of regions according to positions of color pixels of the input image in the color space. The region structurizing unit classifies the plurality of regions into layers according to horizontal, adjacent relation and hierarchical, inclusive relation between the regions, and groups adjacent regions into region groups in each layer, so as to derive a hierarchical, inclusive relation between the region groups. The redundant region combiner determines the order in which adjacent regions are combined according to the horizontal, adjacent relation between regions and the hierarchical, inclusive relation between region groups. The redundant region combiner also determines whether to combine adjacent regions according to the determined combination order, and combines adjacent regions if the adjacent regions are determined to have substantially the same image property.

There is also provided an image segmenting method including an initial image segmenting step and a post processing step. In the initial image segmenting step, color signals of an input image are converted into a predetermined color space and the input image is segmented into a plurality of regions according to positions of color pixels of the input image in the color space. In the post processing step, the plurality of regions are classified into layers according to the horizontal, adjacent relation and hierarchical, inclusive relation between the regions. Adjacent regions are grouped into region groups in each layer, so as to the derive hierarchical, inclusive relation between the region groups, determining the order in which adjacent regions are combined and whether to combine two adjacent regions. Adjacent regions are combined if the adjacent regions are determined to have substantially the same image property.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
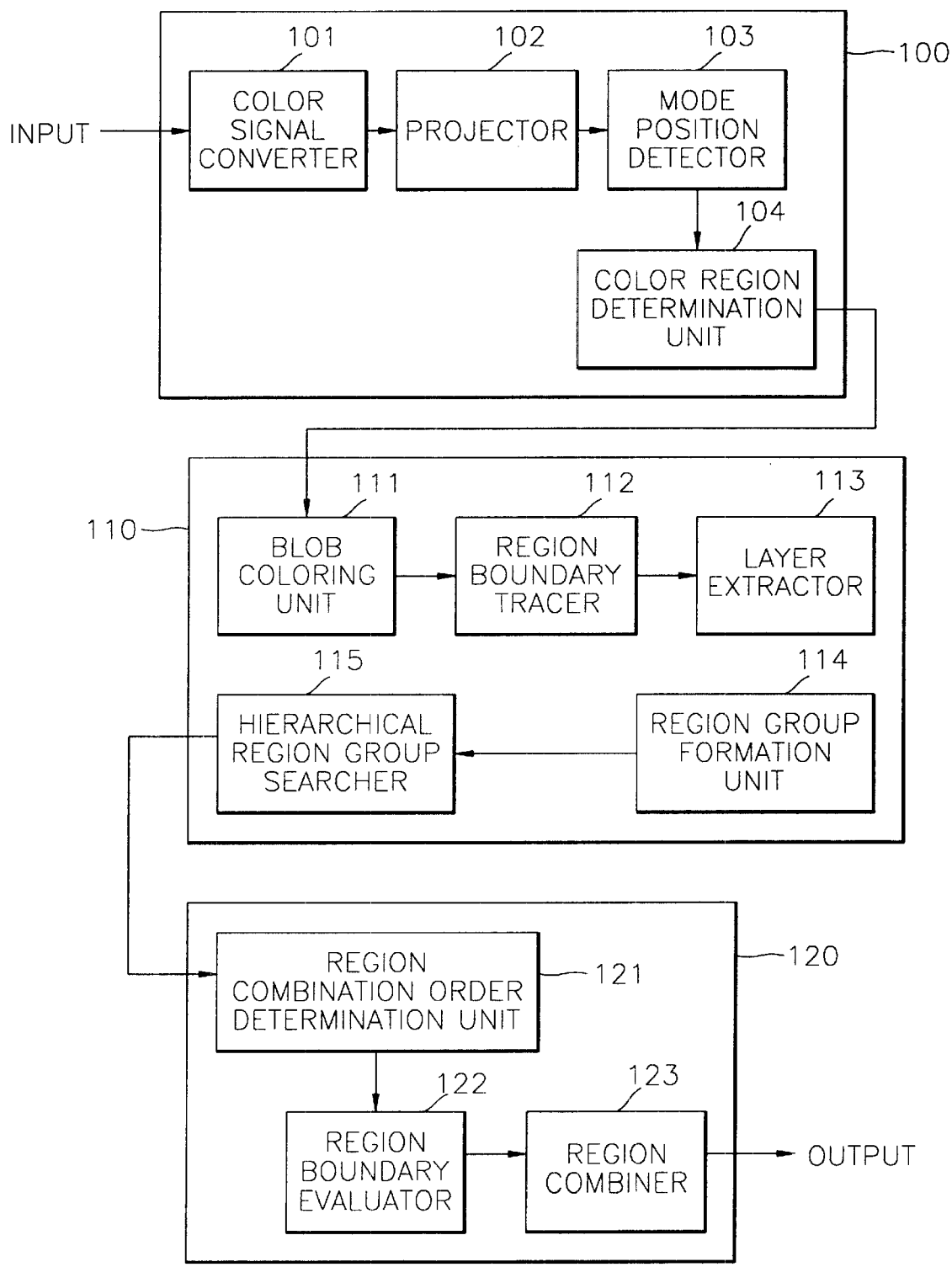
FIG. 1 is a block diagram of an image segmenting apparatus according to the present invention.

The present invention will now be described more fully with reference to the accompanying drawings, in which preferred embodiments of the invention are shown. Referring to FIG. 1, an image segmenting apparatus includes an initial image segmenting unit 100, a region structurizing unit 110 and a redundant region combiner 120.

The initial image segmenting unit 100 segments an input image from a camera or a video according to colors or regions. The region structurizing unit 110 extracts hierarchical region information of each region from information on each segmented region, and structurizes each region according to the extracted hierarchical region information. The redundant region combiner 120 determines the combination order based on information on the structurized regions, and then combines the boundaries of the target regions of combination.

The initial image segmenting unit 100 includes a color signal converter 101, a projector 102, a mode position detector 103 and a color region determination unit 104. The region structurizing unit 110 includes a blob coloring unit 111, a region boundary tracer 112, a layer extractor 113, a region group formation unit 114 and a hierarchical region group searcher 115. The redundant region combiner 120 includes a region combination order determination unit 121, a region boundary evaluator and a region combiner 123.

In the operation of the image segmenting apparatus of the present invention, the color signal converter 101 converts R, G, B signals, which are color signals of an input image, into luminance and chrominance (L, u, v) signals, which comply with human recognition characteristics. The projector 102 projects the L, u, v signals into a three-dimensional color space so that a single dense space is formed for regions having the same color or regions of the same object. The mode position detector 103 detects an average position of data in a dense distribution based on color characteristics, that is, a mode position representing the color characteristic of an average L, u, v signal in a same color region, by using a method, for example, a mean seek algorithm. The color region determination unit 104 determines the width of the distribution at the detected mode position. It is assumed that color pixels within the determined width represent the same region.

The blob coloring unit 111 re-projects modes, which are determined by the color region determination unit 104, and pixels within the distribution of the modes, into an image space and extracts blobs. It is difficult to separately extract only geometrical or topological correlation between color pixels in the image space. Because of the limit of image data driven approaches like the above, redundant regions are inevitably extracted.

Figure 2A:
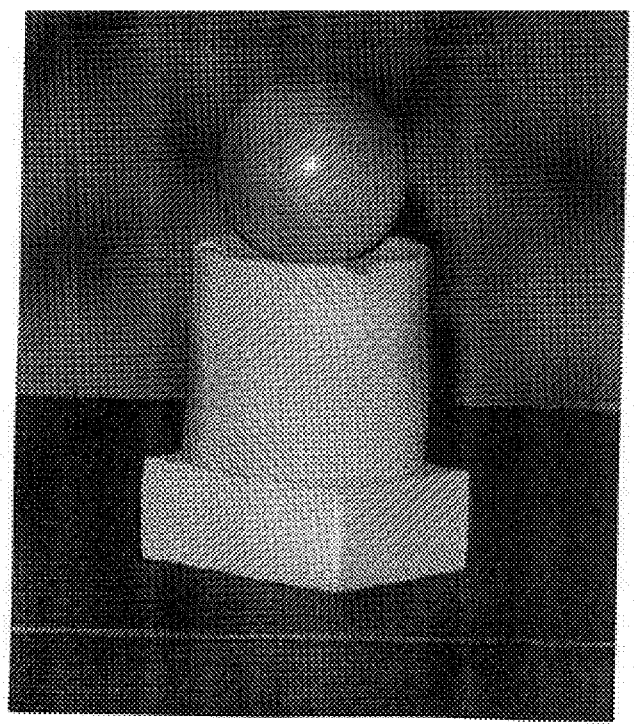
FIG. 2A is an input image which is input to the apparatus of FIG. 1.
Figure 2B:
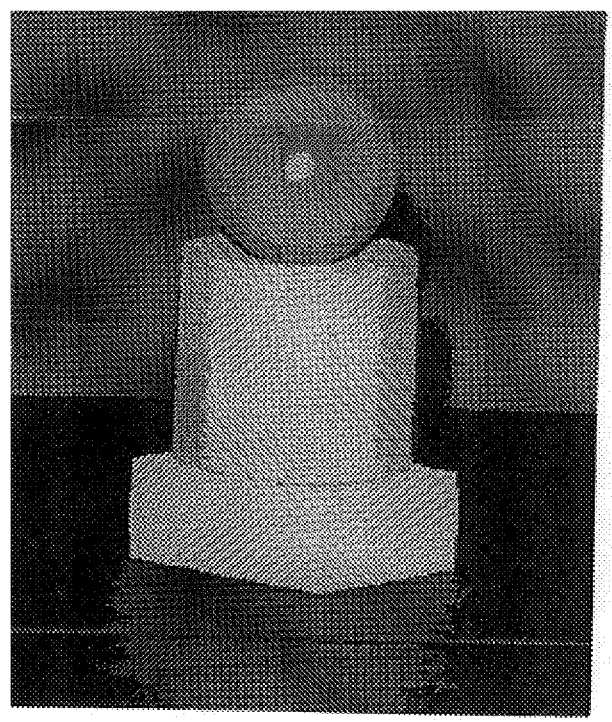
FIGS. 2B through 2D show results of operations of an initial image segmenting unit of FIG. 1.
Figure 2C:
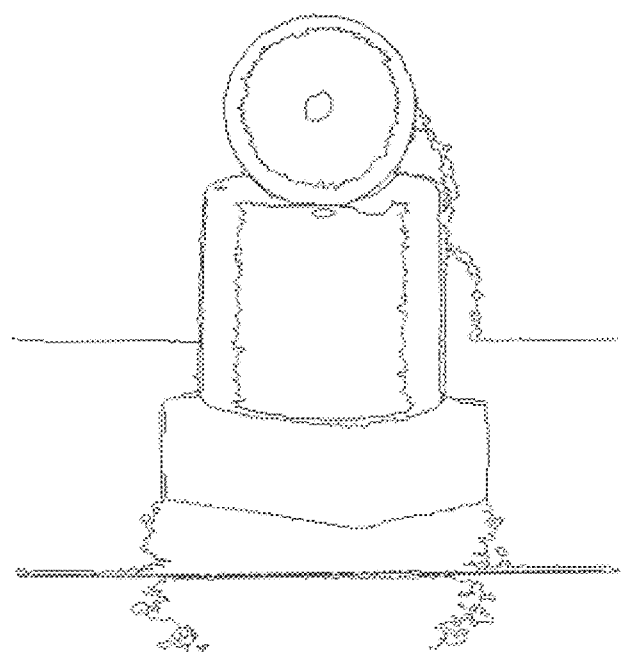
Figure 2D:
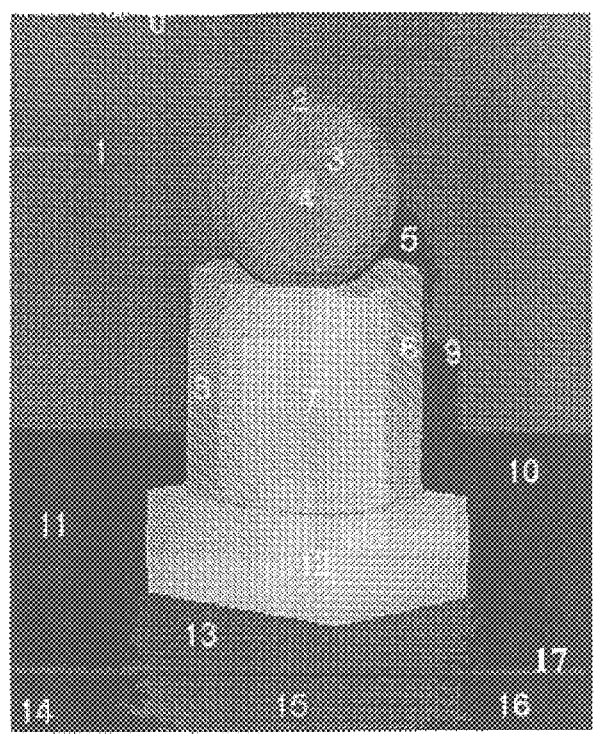

FIGS. 2A through 2D show an example of the procedure described above. FIG. 2A is an original image which is output from a color camera. FIG. 2B is a result of segmenting the image of FIG. 2A. FIG. 2C shows boundaries of segmented regions. FIG. 2D shows a result of numbering regions in order. According to FIG. 2D, the image is redundantly segmented although the original image has only about 5–6 color regions.

Figure 3:
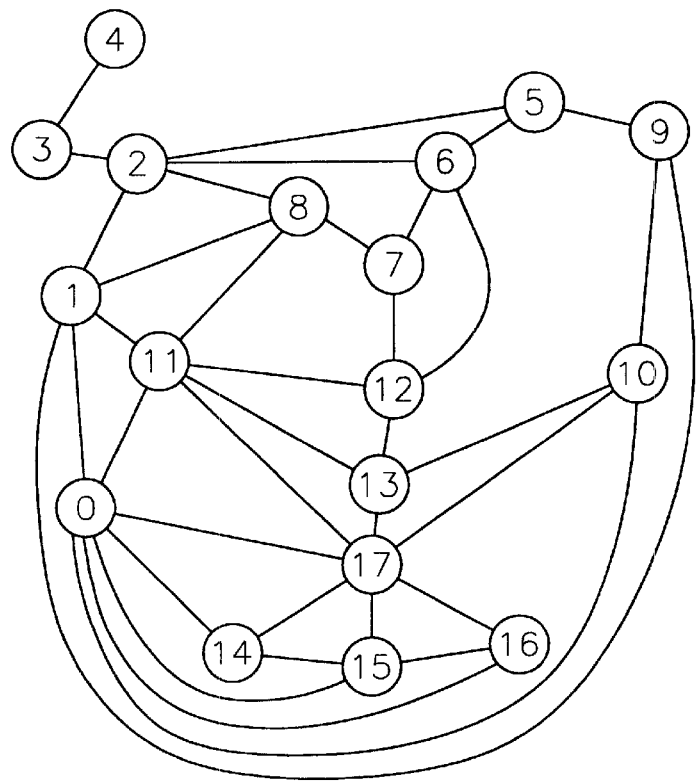
FIG. 3 shows a result of constructing a region adjacent graph (RAG) from the image shown in FIG. 2D.

The region boundary tracer 112 constructs a region adjacent graph (RAG) of each region which is composed of blobs. FIG. 3 shows a result of constructing the RAG from the image shown in FIG. 2D. Small circles containing numbers are nodes representing regions, and adjacent regions have branches connecting nodes. The RAG is characterized by having a horizontal connection structure in which nodes and branches have the same importance.

The layer extractor 113 extracts a structural depth of each node in the RAG and puts the nodes into a hierarchical structure. The region group formation unit 114 forms adjacent nodes belonging to the same layer into a group, and forms each node not adjacent to the other nodes but belonging to the same layer into another group independently. The hierarchical region group searcher 115 searches for hierarchical, inclusive relations among the region groups in every layer. When using a conventional RAG, since nodes are horizontally connected to one another, tests on the relations between adjacent regions are performed in the order of the indexes of sequential connection numbers. In this case, the importance of each region or the combining relation or inclusive relation between regions is not considered, so that results can be completely different according to the order of testing pairs of adjacent regions, as R. Schettini or R. Beveridge pointed out. Accordingly, constant results may not be guaranteed.

In the present invention, the inclusive relations among regions in the intra-layer are primarily tested and then the inclusive relations among adjacent regions in inter-layers are tested so that regions can be combined using a hierarchical structure, so that an orderly combination structure is formed according to the configuration of regions or the inclusive relation between regions in an image. The combination order is similar manner to the order in which a human recognizes objects, and consistent combination relation between regions can be accomplished, differently from the case of using the RAG having a horizontal structure.

The hierarchical combination relation between regions is defined by the following formulas. Primarily, a blob region a is composed of a group of pixels satisfying the condition expressed as the following formula.

$$\forall p \exists q (M(q,\sigma) \wedge C(p,q,f) \rightarrow M(p,\sigma)) \quad (1)$$

wherein,

C(p, q, f): connectivity constraint condition between p and q

M(q, σ): q∈σ.

When the connectivity constraint condition C(p, q, f) indicates a condition in which each pixel is adjacent to 4 or 8 neighboring pixels, this case is defined as follows.

$$\forall p \forall q (N(p,q,f) \wedge U(p,q) \rightarrow C(p,q,f)) \quad (2)$$

wherein,

U(p, q): pixels p and q share a specific characteristic, such as substantially the same color or gray level N(p, q, f): pixels p and q adjacent to each other f: adjacency to 4 or 8 neighborhoods.

A surrounding $(\sigma_i, \sigma_j)$, which indicates that a region $\sigma_i$ is surrounded by a region $\sigma_j$, satisfies the following formula.

$$\forall p(N(p,\sigma'_i) \rightarrow M(p,\sigma_j)) \quad (3)$$

wherein, $\sigma'_i$: the boundary of $\sigma_i$ $N(p_m, \sigma'_i)$: $p_m \notin \sigma'_i$ but $P_{neighborhood\ of\ m} \in \sigma'_i$.

An adjacency$(\sigma_i, \sigma_j)$, which indicates that the region $\sigma_i$ is adjacent to the region $\sigma_j$, satisfies the following formula.

$$\text{adjacency}(\sigma_i, \sigma_j) \Leftrightarrow (\exists p(N(p,\sigma'_i) \wedge M(p,\sigma_j)) \vee (\exists q(N(q,\sigma'_j) \wedge M(q,\sigma_i)) \quad (4)$$

When the region $\sigma_i$ is independent from the region $\sigma_j$, an independence$(\sigma_i, \sigma_j)$ satisfies the following formula.

$$\text{independence}(\sigma_i,\sigma_j) \Leftrightarrow \sim(\text{surrounding}(\sigma_i,\sigma_j) \vee \text{surrounding}(\sigma_j,\sigma_i) \vee \text{adjacency}(\sigma_i,\sigma_j)) \quad (5)$$

A vertically classified region inclusive structure satisfying the above formulas is derived from the RAG.

Figure 4:
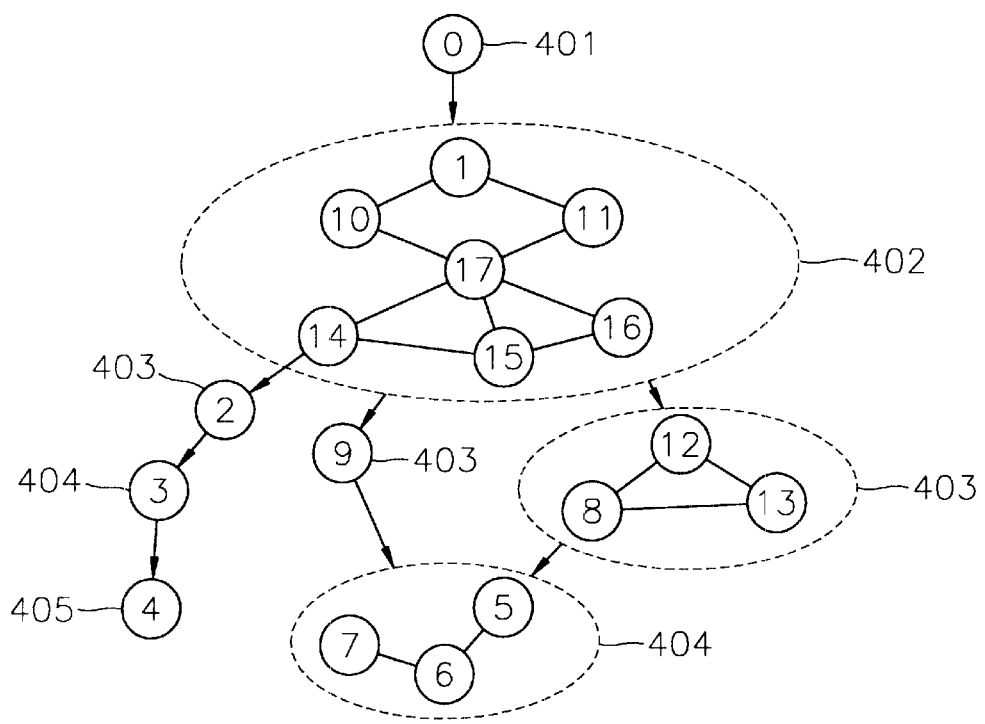
FIG. 4 shows a hierarchical structure based on RAG information as shown in FIG. 3 and inclusive relation between regions.

FIG. 4 shows a hierarchical structure based on RAG information as shown in FIG. 3 and the inclusive relation between regions. Every region in an image is surrounded by an outermost border which is numbered 0, so the region 0 is a first layer 401 which is the highest layer. Next, regions adjacent to the region 0 and horizontally connected to one another are grouped into a second layer 402. The regions in the second layer 402 form a single region group. The second layer 402 surrounds a third layer 403. The third layer 403 is composed of three independent region groups; one group, which is composed of regions 8, 12 and 13, and two groups, which are respectively composed of a region 2 and region 9. A fourth layer 404 is composed of regions surrounded by the regions in the third layer 403. A fifth layer 405 corresponds to the deepest portion in the image. As shown in FIG. 4, branches among nodes indicate horizontal combining relations between regions, and arrows indicate hierarchical inclusive relations between regions.

The region combination order determination unit 121 determines the order in which regions are combined based on the horizontal RAG of the regions and information on hierarchically structurized relations among regions. The region boundary evaluator 122 evaluates the edge magnitude of each region and the geometric uniformity of a boundary between two regions and determines whether to combine the two regions. The region combiner 123 combines two regions into one.

In the order in which regions are combined regions, even if an adjacent relation between two regions satisfies the Formula 4, if they belong to different layers, their combination priority will be considered later than the combination between adjacent regions in the same layer. Regions or region groups, which belong to the same layer and satisfy the adjacency conditions, can be combined prior to the other regions. Regions belonging to different layers can also be verified whether they can be combined. If the combination order is determined, the boundaries of two regions are evaluated and the two regions are combined.

For comparison, the following description concerns a case in which boundary evaluation and region combination are performed based on only the RAG shown in FIG. 3, and a case in which boundary evaluation and region combination are performed based on hierarchical combination relations among regions according to the present invention.

Figure 5A:
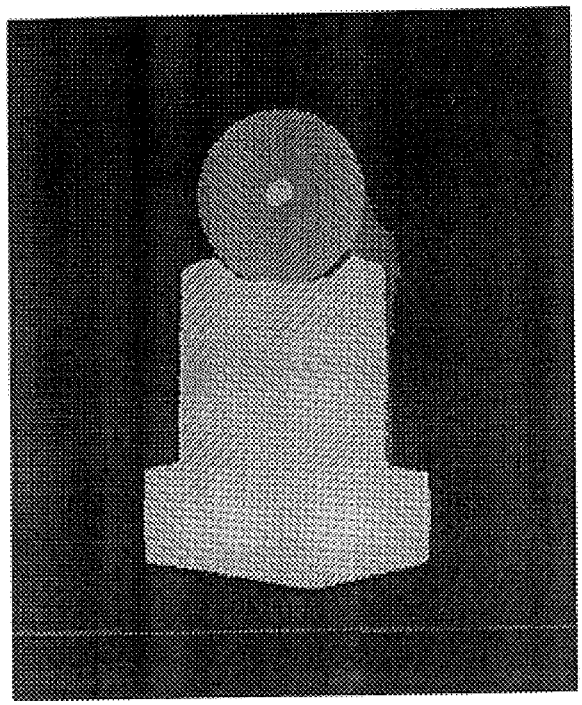
FIGS. 5A and 5B show results of performing image segmentation on the input image of FIG. 2A according to conventional art and the present invention, respectively.

As shown in the RAG of FIG. 3, regions 10 and 1 satisfy the adjacency condition. In this case, if the combination order is determined based on the RAG, the combination between the regions 1 and 9 is primarily evaluated and then the combination between the regions 1 and 10 and the combination between the regions 9 and 10 are sequentially evaluated. Evaluation of the boundary between the regions 1 and 9 and the boundary between the regions 9 and 10 results in the combination of the regions 1 and 9 and the combination of the regions 9 and 10 (that is, the magnitude of the edge) between two adjacent regions is low or the boundary characteristic between two adjacent regions is not uniform). The regions 1 and 10 are determined to be separate regions. Accordingly, the regions 1 and 9 are combined into one region. The combination of the regions 9 and 10 results in the combination of the three regions 1, 9 and 10 into one region, since the regions 1 and 9 are already combined before evaluating the boundary between the regions 1 and 10. In other words, conditions for the combination of the regions 1, 9 and 10 are established by sequential evaluation of combination. A result of the evaluation and combination is shown in FIG. 5A. It can be seen that a bottom portion and a wall portion are combined into one region.

Figure 5B:
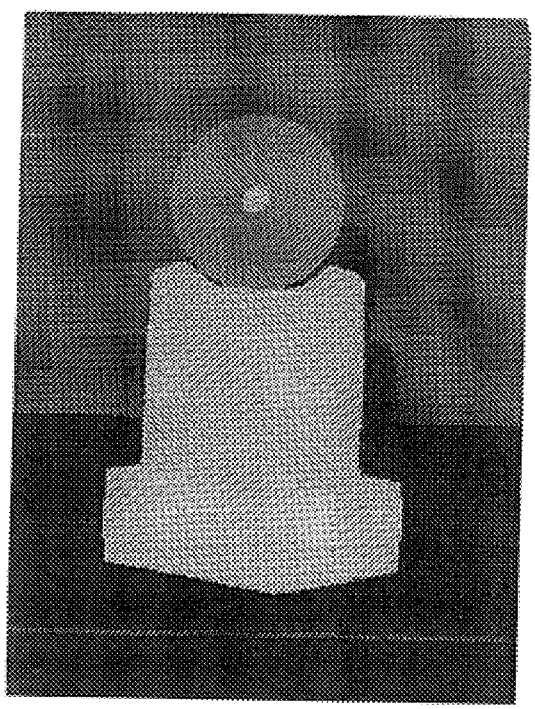

On the other hand, according to the hierarchical combining relation as shown in FIG. 4, since the region 9 belongs to the third layer 403 and the regions 1 and 10 belong to the second layer 402, the region 9 is excluded from initial evaluation of combination although the region 9 satisfies the adjacency conditions with respect to the regions 1 and 10. Regions, which are excluded from the evaluation of combination as described above, can be considered when evaluation is performed on the combining relation between layers, after completing evaluation of combination between regions in each layer. In other words, hierarchical information on each region considers only the relation of the present region with respect to other regions which are included in the same layer or included in a layer one step higher, among regions surrounding the present region. FIG. 5B show a result of combining regions according to the hierarchical combining relation.

Figure 6A:
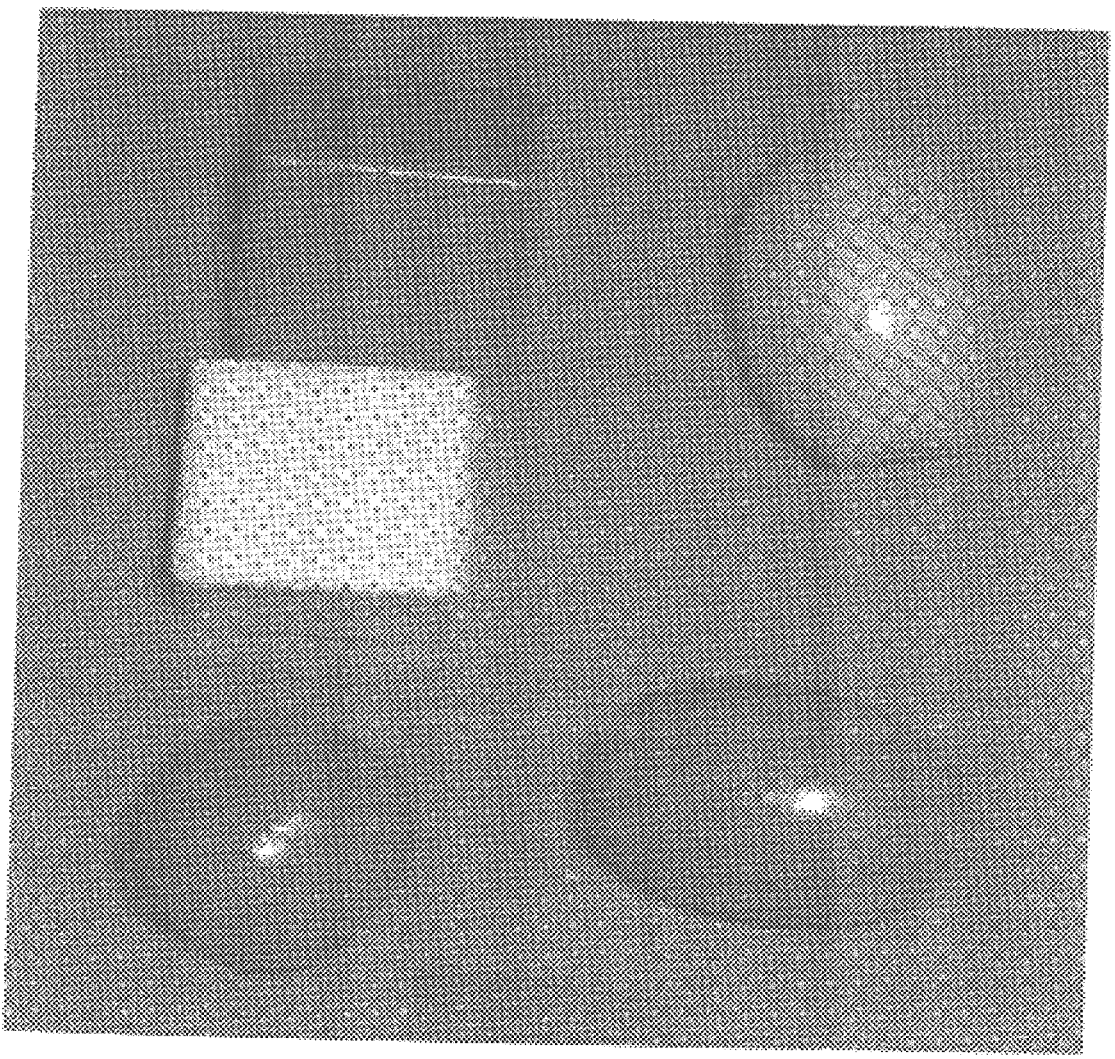
FIG. 6A is another test image different from the image of FIG. 2A.
Figure 6B:
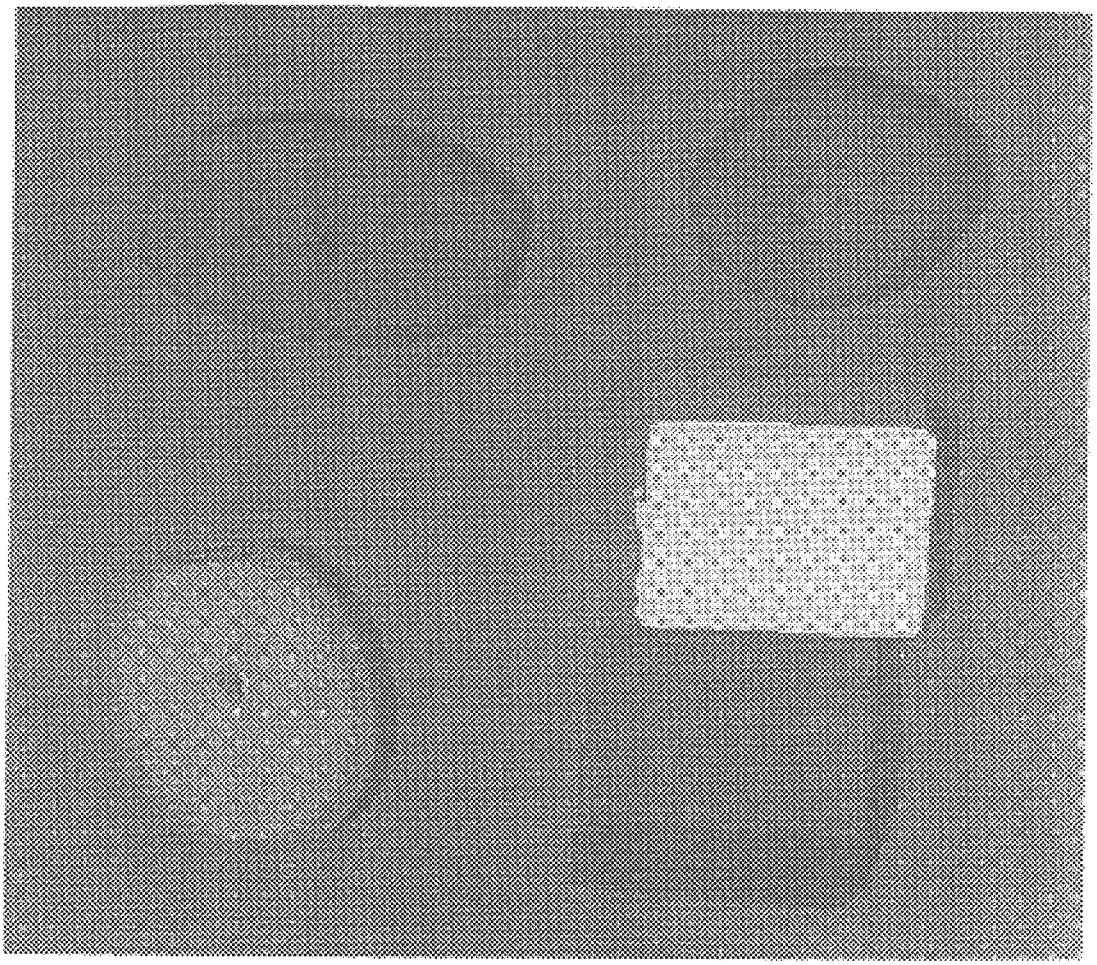
FIG. 6B is an initially segmented image.
Figure 6C:
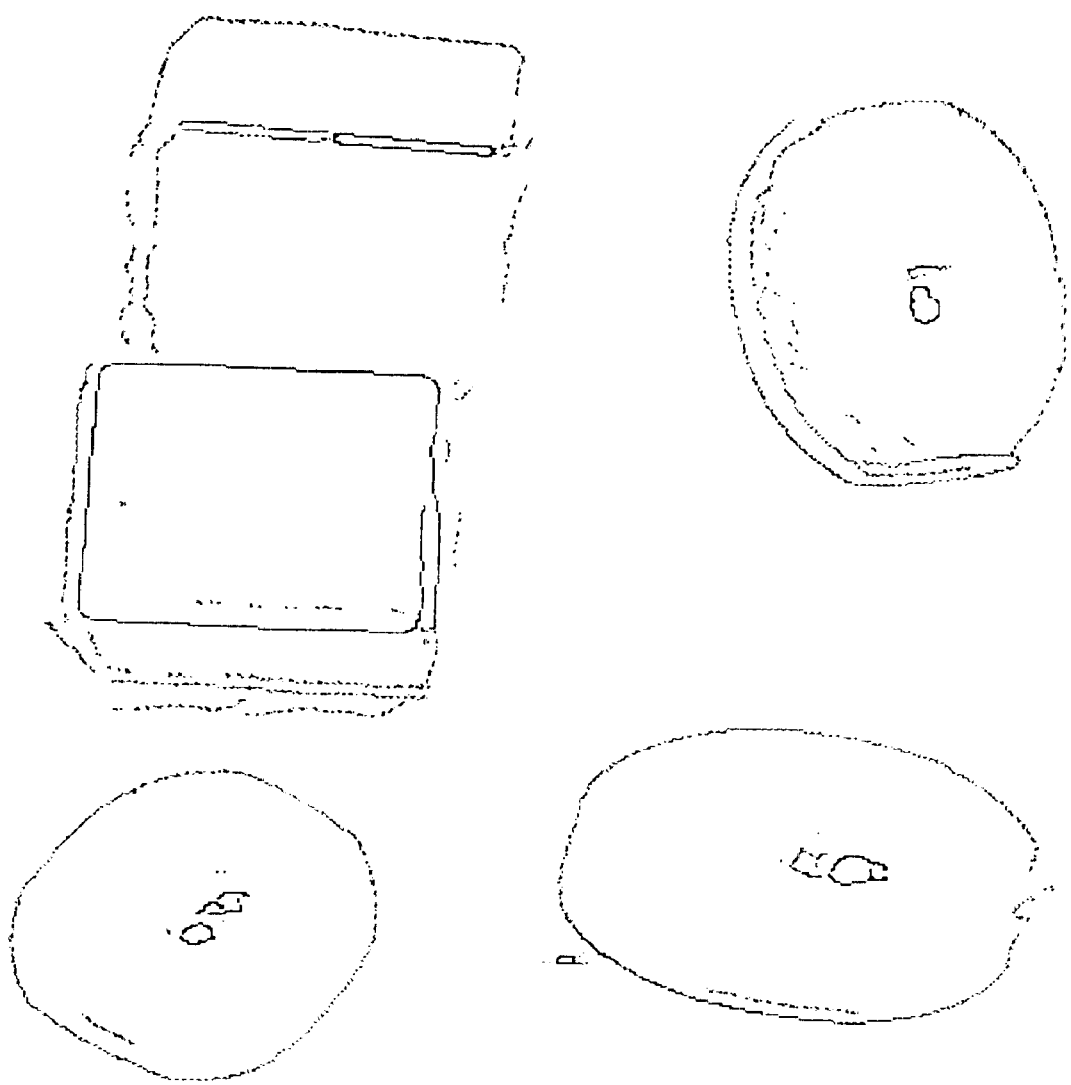
FIG. 6C shows an edge characteristic of each object.
Figure 6D:
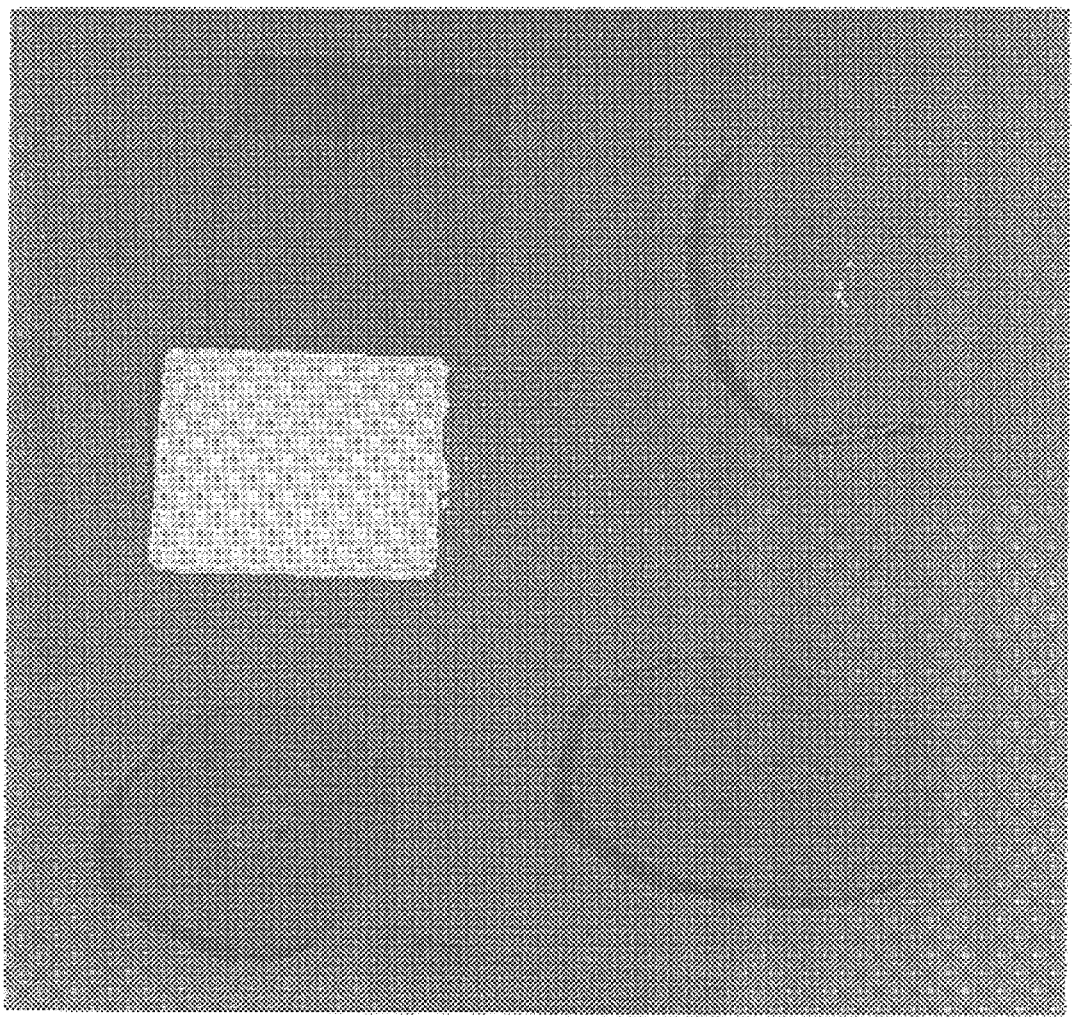
FIG. 6D shows a result of conventional image segmentation considering only a RAG.
Figure 6E:
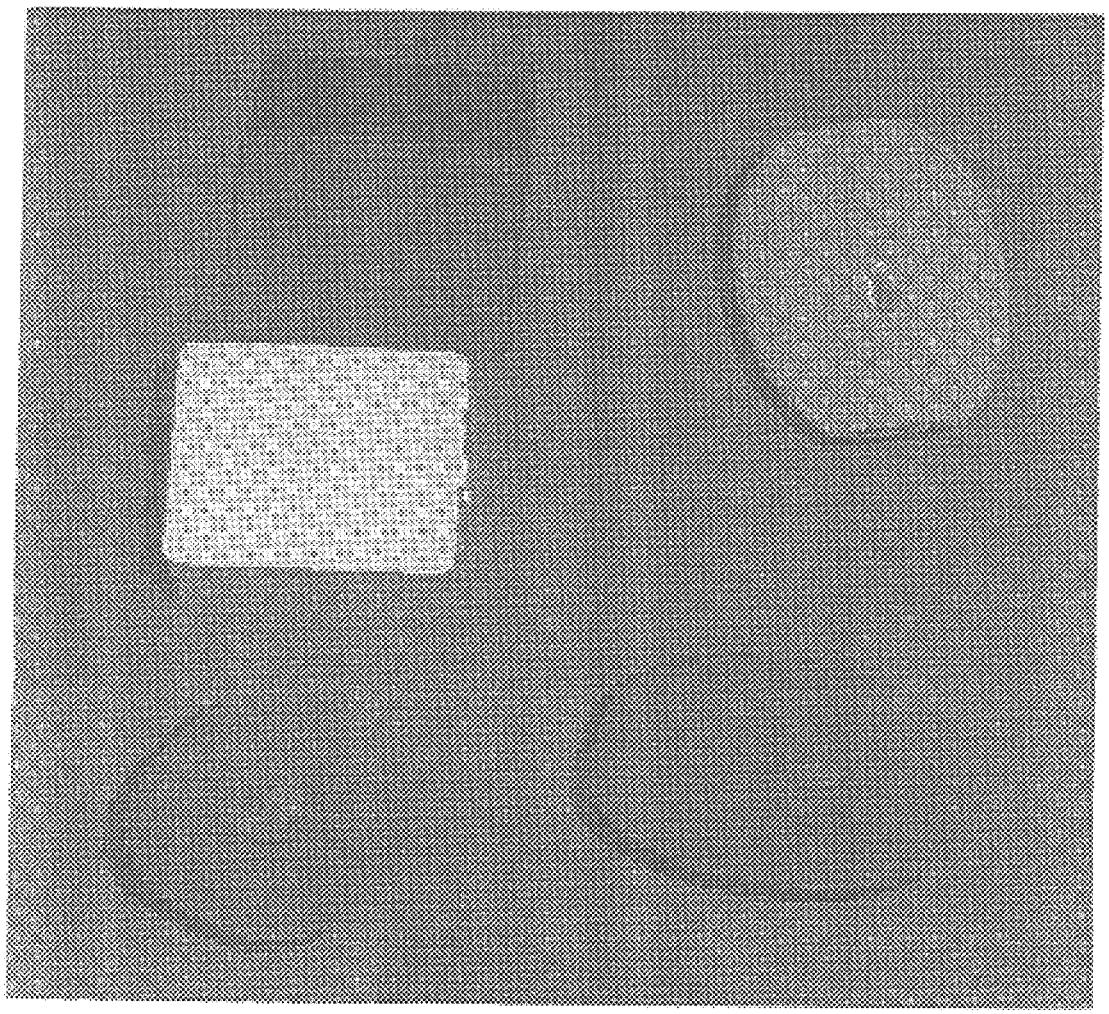
FIG. 6E shows a result of image segmentation according to the present invention.

FIG. 6A is an original image. FIGS. 6B through 6E show the results of segmenting a test image according to the conventional art and the present invention. FIG. 6B is an initially segmented image. FIG. 6C shows the edge characteristic of each object. FIG. 6D shows a result of conventional image segmentation considering only a RAG. FIG. 6E shows a result of image segmentation according to the present invention. When comparing FIG. 6D and FIG. 6E, it can be seen that image segmentation according to the present invention is more accurate than that according to the conventional art which consider only a RAG.

According to the present invention, as well as a RAG, a hierarchical structure is also considered during image segmentation, thereby segmenting an image more accurately. In other words, even if regions appears to be adjacent each other in a RAG, a structural inclusive relation between regions can be derived by excluding the combination of the regions or rearranging their combination order according to a hierarchical structure. Subsequently, the mutual relation between two regions can be inferred from the inclusive relation even if the color signals of the two regions, for example, a region in a highlighted area and a region in its surrounding area, are not similar to each other. Moreover, differently applicable information such as boundary information between regions, edge magnitude of a region, data for evaluating the uniformity of a boundary or an adjacency ratio between adjacent regions, can be derived while deriving a hierarchical relation between regions.

The present invention has been described by way of exemplary embodiments to which it is not limited. Variations and modifications will occur to those skilled in the art without departing from the scope of the invention as set out in the following claims.

What is claimed is:

1. An image segmenting apparatus comprising:
   an initial image segmenting unit for converting color signals of an input image into a predetermined color space and for segmenting the input image into a plurality of regions according to positions of color pixels of the input image in the color space;
   a region structurizing unit for classifying the plurality of regions into layers according to horizontal, adjacent relation and hierarchical, inclusive relation between the regions, and grouping adjacent regions into region groups in each layer, so as to derive a hierarchical, inclusive relation between the region groups; and
   a redundant region combiner for determining the order in which adjacent regions are combined according to the horizontal, adjacent relation between regions and the hierarchical, inclusive relation between region groups, for determining whether to combine adjacent regions according to the determined combination order, and for combining adjacent regions if the adjacent regions are determined to have substantially the same image property.

2. The image segmenting apparatus of claim 1, wherein the region structurizing unit comprising:
   a blob coloring unit for extracting blobs for each region from the input image;
   a region boundary tracer for finding boundaries between regions, which are composed of the extracted blobs, and finding a horizontal, adjacent relation in a hierarchical structure by checking adjacent blobs from the found boundaries;
   a layer extractor for sequentially inspecting an inclusive relation between regions starting from regions representing the background of the input image that is a region in contact with an image boundary, and for classifying the regions into a plurality of layers according to the inspected inclusive relation;
   a region group formation unit for determining whether each region is adjacent to at least one other region in each layer, grouping the regions adjacent to each other into a group if the region is adjacent to other regions in the same layer, and forming a group of one region if the region does not have any adjacent region; and
   a hierarchical region group searcher for deriving a hierarchical inclusive relation between the region groups in each layer.

3. The image segmenting apparatus of claim 2, wherein the blob coloring unit comprises means for extracting a blob region σ which is composed of pixels satisfying the following formula:

$$\forall p \exists q (M(q,\sigma) \wedge C(p,q,f) \rightarrow M(p,\sigma))$$

wherein,

C(p, q, f): connectivity constraint condition between p and q

M(q, σ): q∈σ, wherein the connectivity constraint condition satisfies the following formula:

$$\forall p \forall q (N(p,q,f) \wedge U(p,q) \rightarrow C(p,q,f))$$

wherein,

U(p, q): pixels p and q share a specific characteristic, such as substantially the same color or gray level N(p, q, f): pixels p and q adjacent to each other f: adjacency to 4 or 8 neighborhoods.

4. The image segmenting apparatus of claim 3, wherein, if it is assumed that the inclusive relation between two regions is denoted by a "surrounding ($\sigma_i$, $\sigma_j$)", the layer extractor comprises means for determining the surrounding $(\sigma_i, \sigma_j)$ according to whether the two regions satisfy the following formula:

$$\forall p(N(p,\sigma'_i) \rightarrow M(p,\sigma_j))$$

wherein, $\sigma'_i$: the boundary of $\sigma_i$ $N(p_m, \sigma'_i)$: $p_m \notin \sigma'_i$ but $P_{neighborhood\ of\ m} \in \sigma'_i$.

5. The image segmenting apparatus of claim 4, wherein, if it is assumed that a case, where a region is adjacent to another region in each layer, is represented by "adjacency $(\sigma_i, \sigma_j)$" and a case, where a region is not adjacent to another region, is represented by "independence$(\sigma_i, \sigma_j)$", the region group formation unit comprises means for determining adjacency$(\sigma_i, \sigma_j)$ and independence$(\sigma_i, \sigma_j)$ according to whether the two regions satisfy the following formula, respectively:

$$\text{adjacency}(\sigma_i,\sigma_j) \Leftrightarrow (\exists p(N(p,\sigma'_i) \wedge M(p,\sigma j)) \vee (\exists q(N(q,\sigma'_j) \wedge M(q,\sigma_i)),$$

$$\text{independence}(\sigma_i,\sigma_j) \Leftrightarrow \sim(\text{surrounding}(\sigma_i,\sigma_j) \vee \text{surrounding}(\sigma_j,\sigma_i) \vee \text{adjacency}(\sigma_i,\sigma_j)).$$

6. The image segmenting apparatus of claim 1, wherein the redundant region combiner comprises:

a combination order determination unit for determining the order in which adjacent regions are combined according to the horizontal, adjacent relation between the regions in a hierarchical region structure and the hierarchical, inclusive relation between region groups;

a region boundary evaluator for determining whether to combine two regions in the determined combination order; and a region combiner for combining the two regions when the region boundary evaluator determines that the combination of the two regions is reasonable.

7. An image segmenting method comprising:

an initial image segmenting step of converting color signals of an input image into a predetermined color space and segmenting the input image into a plurality of regions according to positions of color pixels of the input image in the color space; and a post processing step of classifying the plurality of regions into layers according to the horizontal, adjacent relation and hierarchical, inclusive relation between the regions, grouping adjacent regions into region groups in each layer, so as to the derive hierarchical, inclusive relation between the region groups, determining the order in which adjacent regions are combined and whether to combine two adjacent regions, and combining adjacent regions if the adjacent regions are determined to have substantially the same image property.

8. The image segmenting method of claim 7, wherein, in the post processing step, the combination order determination is performed with respect to surrounding regions belonging to the same layer as the region to be determined belongs, or regions belonging to a layer one step higher than a layer where the region to be determined belongs.

9. The image segmenting method of claim 7, wherein, in the post processing step, the combination order determination determines edge magnitude at the boundary between adjacent regions or geometric uniformity of the boundary.

* * * * *